United States Patent [19]

Rau

[11] 3,772,134
[45] Nov. 13, 1973

[54] QUARTZ GLASS ELEMENTS

[75] Inventor: Karlheinz Rau, Hanau-on-Main, Germany

[73] Assignee: Heraeus-Schott Quarzschmelze GmbH, Hanau-on-Main, Germany

[22] Filed: July 28, 1971

[21] Appl. No.: 166,842

[30] Foreign Application Priority Data
Aug. 4, 1970  Germany................ P 20 38 564.2

[52] U.S. Cl............. 161/164, 65/33, 65/DIG. 8, 106/39 DV, 106/47, 106/52, 138/141, 138/145, 138/177, 161/1, 161/192, 161/193
[51] Int. Cl....... B32b 7/02, B23b 17/06, C03c 3/06
[58] Field of Search................ 161/1, 164, 192, 161/193; 106/39 DV, 47, 52; 65/DIG. 8, 33, 60; 138/140, 141, 145, 177; 117/94, 123 A, 124 A

[56] References Cited
UNITED STATES PATENTS

| | | | |
|---|---|---|---|
| 2,998,675 | 9/1961 | Olcott et al. | 49/77 |
| 3,275,493 | 9/1966 | MacDowell | 161/1 |
| 3,298,553 | 1/1967 | Lusher | 215/1 |
| 3,445,252 | 5/1969 | MacDowell | 106/39 |
| 3,116,137 | 12/1963 | Vasilos et al. | 65/18 |

Primary Examiner—Daniel J. Fritsch
Attorney—Ralph D. Dinklage et al.

[57] ABSTRACT

Quartz glass element, such as a diffusion tube useful in the production of semiconductor elements, capable of forming an outer layer of uniformly fine crystalline silica such as cristobalite or tridymite when heated to a temperature at which such crystalline silica forms containing crystallization promoting nuclei having a rate of diffusion in quartz glass less than that of sodium at elevated temperatures. Such nuclei are present in the outer half of the element wall and the maximum concentration of such nuclei is at the surface of the element and then diminishes inwardly. When the quartz glass element is exposed to elevated temperatures, the nuclei promotes the formation of the outer layer of uniformly fine crystalline silica which imparts thermal dimensional stability for extended periods of use at elevated temperatures.

11 Claims, 6 Drawing Figures

Patented Nov. 13, 1973　　　　　　　　　　3,772,134
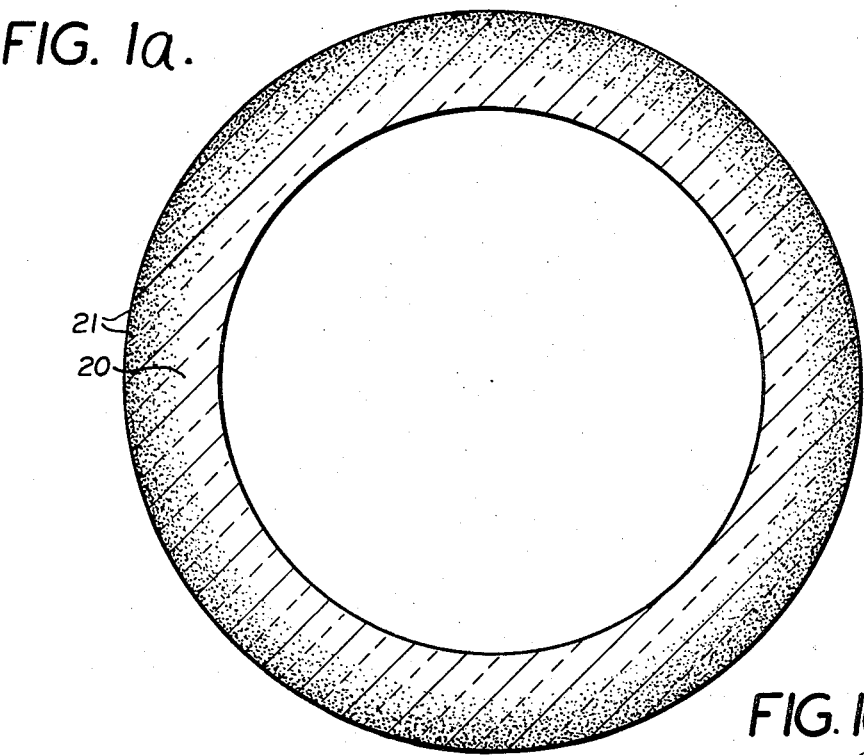
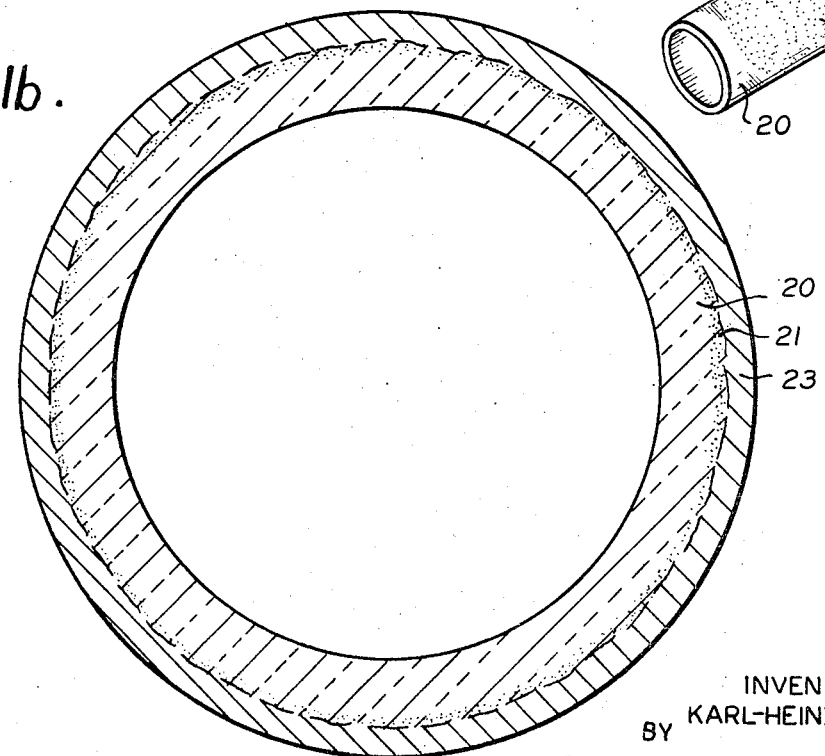
INVENTOR
KARL-HEINZ RAU
BY
BURGESS, DINKLAGE & SPRUNG
ATTORNEYS.

Patented Nov. 13, 1973
3,772,134
2 Sheets-Sheet 2
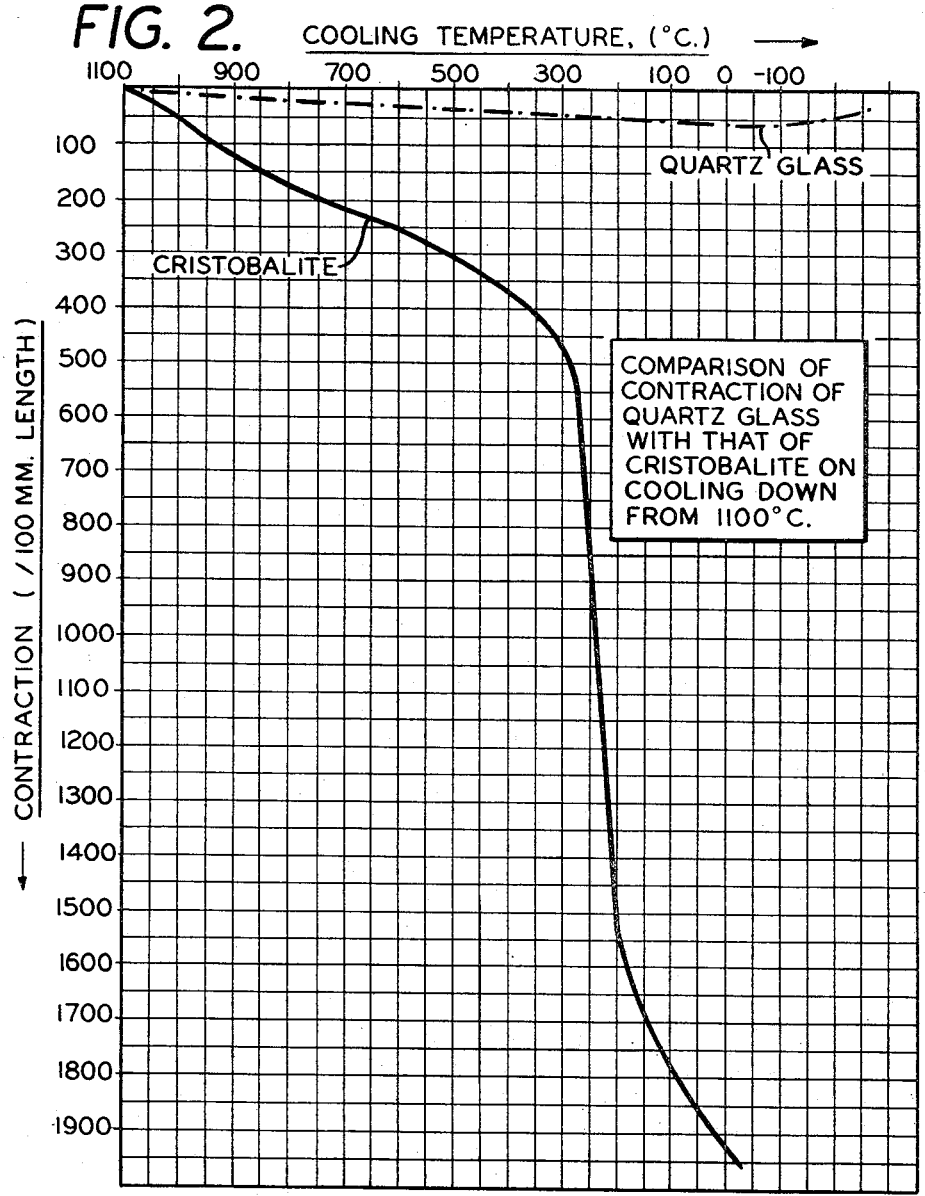
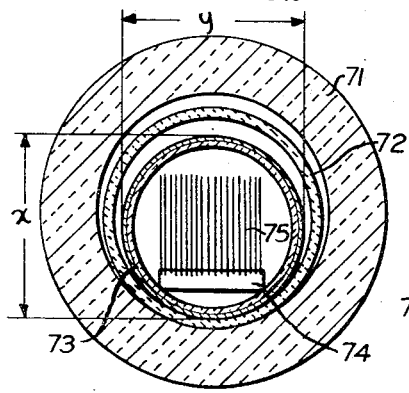
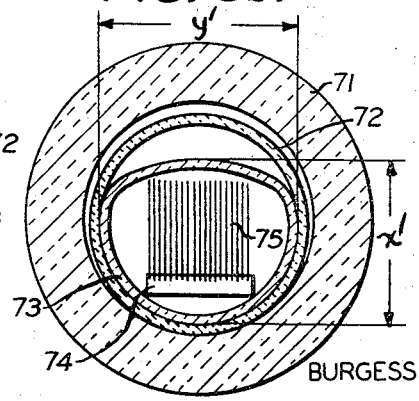
INVENTOR
KARL-HEINZ RAU
BY
BURGESS, DINKLAGE & SPRUNG
ATTORNEYS.

QUARTZ GLASS ELEMENTS

BACKGROUND

This invention relates to quartz glass elements having improved thermal dimensional stability making them suitable for use at elevated temperatures for extended periods of time. More particularly, this invention relates to improved quartz glass elements having a hollow or tubular shape especially useful for producing semiconductor elements at temperatures higher than previously attainable with prior quartz glass elements.

In the art of producing semiconductor elements such as diodes, four-layer diodes, transistors, integrated circuits and the like, diffusion processes are employed, for example, for doping the semiconductors. For this purpose, the semiconducting crystal is subjected at high temperatures to the action of different gaseous atmospheres, for example, a phosphorus atmosphere and/or a gallium atmosphere. The semiconducting crystal or crystals which in many cases have the shape of small plates are then secured on a carrier of quartz glass. For carrying out the diffusion process, this carrier upon which the semiconducting crystals are applied is inserted into a diffusion tube of quartz glass in an electrically heated annealing furnace. The gaseous atmosphere which is predetermined for doping the semiconducting crystals is then maintained in the diffusion tube at a predetermined diffusion temperature. This is usually done by conducting the doping substance through the quartz-glass tube in the form of a gaseous current.

In order to carry out their functions properly, the semiconducting elements must possess certain properties, especially insofar as the cross-sectional diffusing shape, the resistance values and the durability of the carriers are concerned. These properties are, however, determined to a very considerable extent by the amount of impurities and also by the presence of so-called semiconductor poisons which might enter and contaminate the semiconducting elements during the course of their production. Therefore, not only the raw material but also all other materials which might possibly affect the purity of these elements in the course of their production either directly or indirectly have to comply with extremely high requirements of purity. When quartz glass is employed as a material in the production of semiconducting elements, these requirements previously necessitated the carriers for the semiconducting crystals and the diffusion tubes to be made of a quartz glass of such a high degree of purity that it preferably contained a total of less than 4 ppm (parts per million) of metallic impurities.

In order for the diffusion treatment to be carried out within the shortest possible length of time, it should be effected at the highest possible temperature since the rate of speed of diffusion increases very rapidly as the temperature is increased. However, the upper temperature limit at which diffusion treatments could previously be carried out in actual practice amounted only to approximately 1,200° to 1,280°C. and often they had to be carried out at a temperature of less than 1,200°C. since by remaining continuously in the annealing furnace the diffusion tubes of quartz glass were often plastically deformed to the extent that the carriers with the semiconducting crystals thereon would no longer fit into the tubes.

The French Pat. No. 1,293,554 discloses a diffusion tube which consists of quartz and is provided on its outer side with a coating which will become liquid at the temperature at which the semiconducting crystals are treated. This coating is intended to prevent impurities from penetrating by diffusion through the quartz diffusion tube into the area within the quartz tube which forms the treating chamber for the semiconducting crystals. However, such diffuion tubes of quartz glass which remain continuously in the annealing furnace also have the disadvantage that they will be plastically deformed very considerably when the diffusion temperature is made too high.

The deterioration of diffusion tubes by cracking is caused by irregular devitrification or recrystallization of the quartz glas brought on by exposing such tubes to elevated temperatures such as those encountered in preparing semiconductor elements. Prior attempts to overcome this problem of thermal instability were directed at preventing or retarding devitrification or recrystallization. For example, in U.S. Pat. No. 2,904,713, quartz glass is produced wherein substantially no crystallizaion seeds are present thus imparting to the quartz glass a high resistance against recrystallization. In U.S. Pat. Nos. 3,370,921 and 3,472,667 elemental silicon or boron are utilized to create an oxygen deficiency in quartz bodies thus minimizing crystalline growth. And in U.S. Pat. No. 2,568,459, a glaze applied to the quartz surface retards and largely prevents quartz devitrification by preventing the diffusion of hydrogen through the hot quartz.

In the field of glass ceramics, increased resistance to breaking, cracking or failing due to mechanical impacts has been achieved according to U.S. Pat. Nos. 2,998,675 and 3,275,493 by combining silica, alumina and lithium oxide or magnesium oxide, in certain critical proportions, with a metal oxide crystallization catalyst. Such glass ceramic compositions are subjected to a heat treatment which results in a glass ceramic article having on its surface a thin, semicrystalline layer, which because it has a linear thermal expansion coefficient substantially lower than the interior glass, establishes a compressive stress in and parallel to the surface after the article is cooled. In other words, the interior glass shrinks more on cooling which tends to compress the surface layer in effect making it harder thus resulting in an increase in the modulus or rupture strength of the glass ceramic article. However, this phenomenon has no effect on the notoriously poor stability of glass ceramics because both the semicrystalline layer and the interior glass will rapidly devitrify and deteriorate by cracking at temperatures of 1,000°C. and higher as is characteristic of glass ceramics.

SUMMARY

The present invention provides an improved quartz glass element, such as a diffusion tube useful in the production of semiconductor elements, capable of forming an outer layer of uniformly fine crystalline silica such as cristobalite or tridymite when heated to a temperature at which such crystalline silica forms which contain crystallization promoting nuclei having a rate of diffusion in quartz glass less than that of sodium at elevated temperatures. Such nuclei are present in the outer half of the element wall and the maximum concentration of such nuclei is at the surface of the element and then progressively diminishes inwardly. When the quartz glass element is exposed to elevated temperatures, the nuclei promotes the formation of the outer layer of uniformly fine crystalline silica which imparts to the element thermal dimensional stability for extended periods of use at elevated temperatures.

The quartz glass elements of the present invention are utilized in tubular form in an improved diffusion process for preparing semiconductor elements at temperatures of 1,200°C. and higher and preferably at temperatures of 1,300°C. and higher.

THE DRAWINGS

FIG. 1(a) shows a preferred embodiment of a quartz glass tube 20 containing crystallization promoting nuclei 21 on a greatly enlarged scale in the outer portion thereof which nuclei has its greatest concentration at the outer surface of tube 20 and progressively diminishes inwardly as shown.

FIG. 1(b) is the same as FIG. 1(a) but illustrates the formation of a uniformly fine crystalline silica layer 23 on a greatly exaggerated scale.

FIG. 1(c) shows an alternate embodiment of a quartz glass tube 20 containing crystallization promoting nuclei as in FIG. 1(a) but only in the central doping section of the tube 20.

FIG. 2 is a graph comparing the contraction of quartz glass with that of cristobalite on cooling down from 1,100°C.

FIGS. 3 (a) and 3(b) are end views in elevation illustrating the use of a diffusion tube of the present invention (FIG. 3(a)) in comparison with a diffusion tube of the prior art (FIG. 3 (b)).

DESCRIPTION

It is an object of the present invention to provide a quartz-glass element, for example, of a tubular shaped, which is designed so that, when employed in the production of semiconducting elements which is carried out at a high temperature, that is, of elements such as diodes, four-layer diodes, transistors, integrated circuits or the like, no impurities or semiconductor poisons can pass from this element either directly or indirectly into the semiconducting crystals, and which also permits diffusion treatments to be carried out without detrimental effects at still higher temperatures than could previously be employed.

It has now been unexpectedly discovered that this object may be attained if the outer surface layer of the quartz-glass element such as a tube 20 shown in FIG. 1(a) contains not only silica but also at least one additional crystallization promoting substance 21 which has a degree of concentration of more than 4 ppm and up to several hundred ppm, preferably 10 to 800 ppm, and does not form a poison which will affect the semiconducting element which is to be treated at a temperature above 1,200°C. and preferably above 1,280°C, and which at temperatures between approximately 1,200°C and 1,380°C. has a low rate of speed of diffusion into silica as compared with the rate of sodium.

Prior to this invention is was conventional in the methods of producing semiconductors at high temperatures to employ quartz glass of the highest degree of purity as the material for making the diffusion tube or, for example, the carrier of the semiconducting crystals. The quartz glass elements according to the invention in contrast contain additional substances of particular types and of particular quantities. As an entirely unexpected and very important advantage of these quartz glass elements it has been found that they will show practically no deformation even though they are maintained for a considerable length of time at temperatures of approximately 1,300°C. Thus, it has especially been found that, while diffusion tubes which are made in the conventional manner of quartz glass of a high degree of purity are often considerably deformed, those which are made according to the invention so that their outer surface layer consists of silica and an additional substance were not deformed. The quartz-glass elements according to the invention therefore permit, for example, the diffusion treatment of semiconducting crystals to be carried out at considerably higher temperatures than could previously be employed and without danger that this might cause any detrimental secondary effects. The use of such high temperatures permits the length of time of the diffusion treatment to be reduced considerably since the rate of speed of diffusion increases exponentially with the temperature.

According to this invention a maximum concentration of the nuclei is established at the outer surface of the quartz glass part, especially the quartz glass tube which diminishes steadily towards the interior such that at a depth equal to no greater than half of the wall thickness of the tubular part, it assumes the value of zero or a value equal to the limit concentration of metal ions of the same kind which are present as impurities in the quartz glass. The outer portion of the quartz glass which contains the additional nuclei generally has a thickness of from about 5 to about 200 millimicrons, preferably about 5 to about 100 millimicrons and more preferably about 10 to about 80 millimicrons. When the elements of the invention are employed, as for example when they are used as diffusion tubes in the semiconductor art, a recrystallization commences at temperatures above 1,000°C. with the formation of cristobalite and/or tridymite. This recrystallization starts quickly, uniformly and homogeneously, but on account of the distribution of the nuclei of the invention it progresses slowly and steadily. Crystal anisotropy, which may have the effect of diminishing strength, has not been observed in the quartz glass parts of the invention. The improved stability of shape at high temperatures which is displayed by quartz glass apparatus parts made by the invention is probably to be attributed to the constant growth of the crystalline silica layer owing to the distribution of nuclei according to the invention, and to the shrinkage and tension effects associated therewith. Lastly, an additional advantage is that, due to the high nuclear concentration at the outer surface of the quartz glass part and the compression of the quartz glass structure which this produces during the heating thereof, as for example during the doping of semiconductor elements, the penetration of foreign ions which interfere with the doping process is virtually excluded.

Quartz glass apparatus parts made according to this preferred embodiment are prepared by applying to a clean quartz glass surface a solution containing aluminum or an aluminum compound, for example, which decomposes quantitatively during the heating that follows, and forms pure $Al_2O_3$. To produce a layer of nuclei 30 millimicrons thick, 0.1 mg of aluminum ions per square centimeter is applied. Then the quartz glass surface thus treated is exposed to a temperature of about 1,800°C. for a period of about 3 to 30 minutes. This temperature is so high that no further recrystallization occurs, but the aluminum nuclei diffuse into the silica doing so in such a manner that the concentration of aluminum nuclei steadily diminishes toward the interior. Thereupon the apparatus part is rapidly cooled.

The quartz glass apparatus made by the invention do not differ in appearance from normal quartz glass apparatus parts. After they have been put to use at high temperatures—especially above the transformation temperature of quartz glass—the recrystallization layer forms in a short time, thereby bringing its advantageous characteristics to their full effect.

In FIG. 1a of the drawing there is shown a quartz glass tube 20 formed according to this invention. The nuclei 21 are indicated diagrammatically as dots. It can be seen that the concentration of the nuclei steadily diminishes from the outside in.

Another feature of the invention which has proved to be of great advantage involves applying a protective coating over the finely crystalline layer or coating. Such a protective coating prevents impurites from penetrating into the quartz-glass tube, for example, from the muffle of the annealing furnace, during the period in which the quartz-glass tube is heated up to the temperature at which the doping of the semiconductors is carried out. Such impurities might result in the occurrence of undesirable crystallizing processes in the quartz-glass tube. It has also been found that for producing such a protective layer it is of advantage to employ materials which at temperatures of approximately 1,300°C. do not evaporate very strongly but already become plastic or soft. Such materials may consist, for example, of germanium oxide and silicon oxides or glass mixtures which are plastic at a temperature of approximately 1,300°C.

The phrase "crystallization promoting nuclei" is intended to include those substances that will promote the formation of crystalline silica such as cristobalite and tridymite for example when a quartz-glass element of the invention is heated to a temperature at which such crystalline silica forms.

For purposes of this invention and particularly in the case of diffusion tubes, the temperature at which crystalline silica forms falls within the range of 900° to 1,550°C., preferably in the range of 900° to 1,350°C. Crystalline silica is known to have several forms among which are alpha and beta quartz, alpha and beta cristobalite and alpha and beta tridymite. In the temperature ranges referred to above, the formation of certain crystalline forms is favored and two or more crystalline forms may be present at the same time. For example, in the temperature ranges indicated it is believed that beta cristobalite forms faster than other forms of crystalline silica and for this reason is probably the predominate type of crystalline silica formed according to this invention. However, this invention is in no way limited or restricted to the formation of any particular form or forms of crystalline silica. It is sufficient to form a layer of crystalline silica (whatever its form or forms) as shown in FIG. 1(b) by reference number 23 to obtain the highly desirable properties and advantages of this invention.

It should also be understood that crystalline silica, regardless of type or types, is converted to amorphous or vitreous silica when heated to its fusion temperature which is about 1,730°C., preferably above about 1,750°C., for a period of time sufficient to complete the conversion. Vitreous silica once formed by fusion remains in this form when cooled down to ambient temperatures. It is only when an article formed from vitreous silica is reheated does devitrification or recrystallization occur. The amorphous form of silica is also known as quartz glass, fused silica, vitreous silica, vitreous quartz and fused quartz.

Regardless of the nomenclature, the important difference is that quartz glass elements of the invention are amorphous at the outset and the nuclei present therein forms a layer of crystalline silica when the element is exposed to temperatures in the range of 900°C. to 1,550°C.

Thus, the formation of quartz-glass elements containing nuclei can be carried out without forming crystalline silica due to the fact that at temperatures above the fusion temperature of silica, about 1,730°C., only amorphous silica is formed. Thus, it is possible to supply semiconductor manufacturers with nuclei containing quartz-glass tube after which the beneficial crystalline silica layer is formed during the diffusion process.

The crystallization promoting nuclei are atomic in dimension and include one or more atoms, ions and individual molecules are are the centers around which the crystalline silica forms and grows according to the invention. Suitable nuclei have a rate of diffusion in quartz-glass less than that of sodium at elevated temperatures, for example 1,000°C. or higher, and include an element from Group IV of the periodic table, boron, aluminum, phosphorus, antimony, zinc, magnesium, calcium, gallium and mixtures thereof. Compounds from which nuclei are obtained include the oxides, carbides or nitrides of any of the foregoing, as for example aluminum nitride, aluminum oxide, germanium oxide, tin oxide, silicon carbide, silicon nitride, silica suboxides, and the like. Zinc, mangesium, calcium, tin, boron, phosphorus, aluminum, titanium, zirconium, hafnium, antimony and gallium ions because of their large ions radius have been found to be especially useful for forming fine crystalline silica layers. Most preferred is aluminum.

According to the present invention, crystallization promoting nuclei are diffused into the molecular structure of the quartz glass. A method for accomplishing this is illustrated in Example 2 wherein a solution of a nuclei compound is coated on quartz tube which is subsequently fused into quartz glass. The fusion step decomposes the nuclei compound leaving only the nuclei such as one or more metal ions which are diffused into the molecular structure of the quartz glass.

During the first four to twenty hours of use of a tube according to the invention in a semiconductor doping process, it is believed that a uniformly fine crystalline silica layer forms to a depth approximately equal to the depth of the nuclei. Further exposure to elevated temperatures causes the nuclei to diffuse or migrate further into the tube wall and the crystalline silica layer to continue to grow inherently. However, once the uniformly fine crystalline layer is formed, nuclei diffusion and inherent crystalline growth proceed uniformly and slowly resulting in greatly improved tube life and the ability to use higher temperatures than could be used with prior quartz glass diffusion tubes.

THe nuclei used in this invention are present in an amount of from about 4 to about 800 ppm. Concentration of nuclei ranging between about 10 and 800 ppm. are especially preferred.

The concentration of nuclei at the outer surface of the quartz-glass element is generally less than about $5.10^{17}$ nuclei per sq. cm. and preferably in the range of about $1.10^{14}$ to about $5.10^{17}$ nuclei per sq. cm. Stated in different terms, the surface concentration of nuclei is in the range of about $5.10^{-3}$ to about 25 micrograms per sq. cm.

In the present invention, rather than attempt to prevent or retard divitrification of quartz glass as taught by the prior art, the formation of crystalline silica is promoted in a uniform, very fine manner to yield modified quartz glass elements having totally unexpected longer use at temperatures higher than those that could previously be employed, e.g. 1,300°C. and higher.

Also, as illustrated by the graph which comprises FIG. 2, the coefficient of thermal expansion and contraction of crystalline silica such as cristobalite is appreciably greater than quartz glass. Thus, when a cristalline silica layer is formed in a quartz glass element at elevated temperature and cooled down, the interior quartz glass shrinks less than the outer crystalline layer tending to stretch same thereby establishing a tensile stress in and parallel to the outer crystalline layer. The mechanical stability (surface hardness) of an article according to the invention is less at room temperature than the mechanical stability of customary quartz glass also at room temperature. With respect to the known glass ceramic articles having a compressive stress layer, the object is to achieve above all a high mechanical stability at room temperature, whereas their dimensional stability at elevated temperature is reduced. As against that, the object of the invention is to produce articles having a high dimensional stability at elevated temperatures, where as the stability at room temperature is actually reduced.

Thus, the present invention in its preferred embodiment of a diffusion tube for producing semiconductor elements has crystallization promoting nuclei nonuniformly dispersed throughout the outer portion wherein the concentration of nuclei is at a maximum at the outer surface and then progressively diminishes inwardly to a depth no greater than one-half of the tube wall thickness.

In prior quartz glass elements, impurities (such as those sought to be removed in U.S. Pat. No. 2,904,713) are believed to be the seeds for devitrification which, once initiated, proceeds nonuniformly and uncontrolled until the entire element is devitrified. This devitrification known for diffusion tubes of luminous-discharge lamps and which results from the accidental and nonuniform distribution of impurities leads to a nonuniform devitrification of the diffusion tube creating nonuniformly distributed stresses in the tube resulting in the breakage of the tube. In the present invention, the devitrification process is utilized in a unique way resulting in higher use temperatures over longer periods of time than heretofore available. The presence of nuclei or a crystalline silica coating as described herein causes devitrification to occur but with the formation of a uniform, very fine crystalline silica layer which, because of its uniform and fine nature, results in very slow progressive devitrification. This slow down of devitrification has resulted in a 25 to 50 percent increase in the useful life of quartz glass diffusion tubes.

FIGS. 3(a) and 3(b) show by way of example the greatly improved diffusion tube of the present invention as compared to a known quartz glass diffusion tube. In FIG. 3(a) and 3(b) the same basic set-up was used. In 3(a) a diffusion tube containing crystallization promoting nuclei prepared according to Example 1 herein was employed and in FIG. 3(b) a quartz glass diffusion tube prepared in a similar manner but without such nuclei was employed. To carry out the test the diffusion tubes 73 were placed in a ceramic tube 72 and then into a heating chamber 71 of a diffusion furnace. In each of the diffusion tubes 73 there was placed a rack 74 which was loaded with a plurality of semiconductor discs 75. Each of the diffusion tubes 73 had an initial wall thickness of 2.5 mm and a diameter of 80 mm. After heating at a temperature of 1,280°C. for a period of 720 hours, the dimensions $x$ and $y$ of the diffusion tube of the present invention shown in FIG. 3($a$) were respectively 78.97 mm and 81.08 mm indicating virtually no change in diameter. However, as shown in FIG. 3($b$) the quartz glass diffusion tube without crystallization promoting nuclei changed radically in shape. In this instance the dimensions $x'$ and $y'$ were 71.20 mm and 86.50 mm respectively.

The following additional examples are intended to illustrate the present invention without limiting the same in any manner.

EXAMPLE 1

The general fabricating procedure for a quartz glass diffusion tube is as follows.

Pure quartz crystal granules (e.g. 10 kgs) as they are customarily used for the fusion of pure quartz glass are placed into a graphite crucible and heated in a vacuum melting furnace steadily and slowly to a melting temperature (approx. 1,750°C), and, subsequently maintaining the melting temperature until they are fused into clearly transparent quartz glass. The vacuum melting furnace is an electrically heated (inductively or by current passage) furnace within a vacuum chamber which, prior to and during the melting procedure, is evacuated to a pressure of approx. $10^{-3}$ Torr by mechanical vacuum pumps. The resulting fused quartz glass block is subsequently drawn to a tube in an electrically heated quartz glass drawing furnace. The tube drawing furnace essentially consists of a graphite crucible wherein the quartz glass block lies; at its bottom the crucible has an opening with a nozzle and a mandrel forming the outside and the inside surface of the drawn tube during the drawing process. The electrical heating elements are arranged in the same way as in the melting furnace. However, in the tube drawing, no evacuation takes place.

EXAMPLE 2

An optimum method for producing a tube according to the invention with nonuniformly dispersed crystallization promoting nuclei in the outer portion of the wall of that tube is as follows:

A solution containing Al-ions, which may be mixed with an adhesive or bonding agent, is applied to a tube or a hollow cylinder, dried and subjected to a heating process as in Example 1 of such duration and temperature that the Al-ions are able to diffuse into the desired wall depth. The quantity of Al-solution applied depends on the degree of deformation during the after-treatment (tube drawing) in the heating process (as described in Example 1) and increases to the extent that the surface of the cylinder or the tube in the heating process is increased. This procedure is as follows:

On a quartz glass cylinder having an outer surface area of 6 dm², out of which diffusion tubes having a total surface area of 60 dm² are to be drawn, 0.9 g of the following solution is applied per dm² of cylinder surface area:

73 g Al $(NO_3)_3$ dissolved in 100 g $H_2O$. The solvent film is dried at 40° to 80°C. and the cylinder is drawn into a tube in the usual manner. During the drawing process, during which each cylinder element is at a temperature of 1,700° to 2,000°C. for 3 to 30 minutes, a part of the $Al_2O_3$ applied and formed as an intermediate evaporates so that in the outer portion of the tube wall of the drawn tube an Al surface concentration remains of approximately $1-2.10^{-3}$ g/dm² Al-ions.

If, a drawn tube is provided with a coating of the crystallization promoting nuclei on a glass blower's lathe, whereby the tube is not drawn out, care has to be taken that correspondingly less Al nitrate solution is applied, e.g., only $5.10^{-3}$ g/dm² Al-ions.

If, a drawn tube is provided with a coating of the crystallization promoting nuclei on a glass blower's lathe, whereby the tube is not drawn out, care has to be taken that correspondingly less Al nitrate solution is applied, e.g., only $5.10^{-3}$ g/dm², leaving approximately $2.10^{-3}$ g per dm² of tube surface area after evaporation.

EXAMPLE 3

The production of diffusion tubes to be provided with the dimensionally stabilizing coating only on parts over their length is carried out according to Example 2 preparing and processing only the thermally highly stressed middle sections of the tube. If diffusion tubes stabilized by sections are to be produced from material made according to Example 2, then, following the glass blower's technique, sections are put together from the desired part lengths from pure and stabilized quartz glass.

EXAMPLE 4

The production of stabilized tubes according to the invention having an outer protective layer is achieved by applying on a stabilized tube a known, more readily fusible glass composition in the form of a powder or in the form of a solution in accordance with known enamelling techniques or in the form of a thin glass film in accordance with known glass processing techniques (e.g., in the form of a thin-walled tube) and fusing into a tube unit in a further heating process.

This process can also be used for the tubes prepared according to Examples 2 and 3, fusing together in the subsequent heating process the protective coating as well as the stabilizing coating with the pure quartz glass tube or hollow cylinder.

What is claimed is:

1. Quartz glass element capable of forming an a tensilely stressed outer layer of uniformly fine crystalline silica when heated to a temperature at which such crystalline silica forms containing crystallization promoting nuclei having a rate of diffusion in quartz glass less than that of sodium at elevated temperatures, the surface concentration of said nuclei being less than about $5.10^{17}$ nuclei per sq. cm., the concentration of said nuclei being at a maximum at the outer surface of said element and progressively diminishing inwardly to a depth no greater than one half of the thickness of such element.

2. Element of claim 1 wherein said nuclei are selected from the group of a Group IV element, boron, aluminum, phosphorus, antimony, zinc, magnesium, calcium, gallium, and mixtures of the foregoing.

3. Element of claim 1 wherein said element is a diffusion tube for producing semiconductor elements.

4. Element of claim 1 wherein the surface concentration of said nuclei is from about $1.10^{14}$ to about $5.10^{17}$ nuclei per sq. cm.

5. Element of claim 1 wherein the depth of said nuclei is from about 5 to about 200 millimicrons.

6. Element of claim 1 wherein the depth of said nuclei is from about 5 to about 100 millimicrons.

7. Element of claim 1 wherein the depth of said nuclei is from about 10 to about 80 millimicrons.

8. Element of claim 1 having said tensilely stressed outer layer formed by heating to a temperature at which crystalline silica forms.

9. Element of claim 1 wherein said crystalline silica is selected from the group of cristobalite and tridymite.

10. Diffusion tube of claim 3 having said tensilely stressed outer layer formed by heating to a temperature at which crystalline silica forms.

11. Diffusion tube of claim 3 wherein only the central outer portion thereof is provided with said crystallization promoting nuclei.

* * * * *